(12) United States Patent
Kyoya et al.

(10) Patent No.: US 6,560,188 B1
(45) Date of Patent: May 6, 2003

(54) COMPOUND OPTICAL UNIT MOUNTED ON OPTICAL DEVICE

(75) Inventors: Shoichi Kyoya, Miyagi-ken (JP); Tatsumaro Yamashita, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 144 days.

(21) Appl. No.: 09/675,461

(22) Filed: Sep. 28, 2000

(30) Foreign Application Priority Data

Oct. 1, 1999 (JP) .......................................... 11-282153

(51) Int. Cl.[7] ................................................. G11B 7/00
(52) U.S. Cl. .................... 369/112.03; 369/120; 369/121
(58) Field of Search ........................ 369/44.12, 112.01, 369/112.03, 112.05, 112.09, 112.28, 112.29, 120, 121, 124.09

(56) References Cited

U.S. PATENT DOCUMENTS 4,792,674 A    12/1988  Hirano
5,712,841 A *   1/1998  Opheij et al. ............ 369/44.12

* cited by examiner

Primary Examiner—Paul W. Huber
(74) Attorney, Agent, or Firm—Brinks Hofer Gilson & Lione

(57) ABSTRACT

A compound optical unit includes a housing mounted to an optical pickup. A semiconductor laser, a light receiving member, and a composite optical member are integrally fixed to the housing. The semiconductor laser has a laser diode that emits a laser beam for a DVD. The composite optical member is provided with an incidence surface that admits light emitted from the semiconductor laser, an emission surface emits the light, a diffraction grating provided on the emission surface diffracts light reflected by an optical disk D, a reflecting surface that reflects light diffracted by the diffraction grating, and another emission surface that emits light reflected by the reflecting surface toward the light receiving member.

45 Claims, 5 Drawing Sheets

COMPOUND OPTICAL UNIT MOUNTED ON OPTICAL DEVICE

BACKGROUND OF THE INVENTION

1. Field of the Invention

The present invention relates to a compound optical unit as a combination light receiving/emitting optical element suitably used in an optical device, such as an optical pickup, which applies light onto an optical disk and receives returned light from the optical disk in order to perform writing or reading of information on the optical disk.

2. Description of the Related Art

As an example of compound optical units, a combination light receiving/emitting optical element has been proposed and used which applies laser beam onto an optical disk or which receives laser beam from the optical disk in order to perform recording or reproduction of information on the optical disk.

To write information on an optical disk, such as a CD (compact disk), a CD-R (write-once compact disk), or a DVD ("digital versatile disk" or "digital video disk"), or to read information on an information-recording surface of the optical disk, an optical pickup is used, and an optical unit is mounted on the optical pickup.

When various types of optical components are mounted on the optical pickup, positions or angles of the optical components with respect to the optical pickup are adjusted so as to optimally perform writing or reading of information on the-optical disk. In this case, in an optical unit having a combination of a light receiving section and a light emitting section, the relationship between light receiving position and a light emitting position is not changed even by the adjustment. Therefore, wide allowable ranges of the positions and the angles of the optical components can be ensured, and the positions and the angles can be easily adjusted. Such an optical unit has been widely used. In order to reduce the size of the optical pickup, an optical unit has been developed of reduced size.

In recent years, DVD apparatuses for writing/reading information on a DVD, which is an optical disk having a higher recording density than a CD, have been commercialized, and reduction in cost of the DVD apparatuses is essential in order for the DVD apparatuses to become more popular. Accordingly, a reduction in cost of an optical unit used in an optical pickup to be mounted on the DVD apparatuses has been demanded.

In addition, compatibility with CDs (including CD-Rs) has been demanded for the DVD apparatuses. Therefore, the DVD apparatuses should include a laser light source (with a wavelength of 650 nm) for a DVD, and a laser light source (with a wavelength of 780 nm) for writing and reading information on the CD-R which cannot be read by a laser light source with a wavelength of 650 nm.

FIG. 5 is a plan view showing an optical pickup 20 having conventional optical units 4 and 8 mounted thereon. The optical pickup 20 is primarily composed of the optical unit 4 for a DVD (high-density optical disk) 17, the optical unit 8 for a CD (low-density optical disk) 18, a beam splitter 10 for guiding laser beams of various wavelengths, emitted from the optical units 4 and 8, to the same optical axis, a wavelength filter 15 serving as a diaphragm for restricting the diameter of the laser beam in accordance with the wavelength of the laser beam, an objective lens 16, and a carriage 21 for disposing the above components at predetermined positions so as to be able to read information from both the DVD 17 and CD 18.

The above components will now be described in detail.

The optical unit 4 is composed of a light source 2, which is a laser diode chip for emitting laser beam of a wavelength of 650 nm for the DVD 17; a light-receiving element 3 consisting of a photo-diode serving as a light receiving member for receiving laser beam reflected by the DVD 17; a base plate 4a having the light source 2 and the light-receiving element 3, a side wall 4b fixed to the base plate 4a contains the light source 2 and the light-receiving element 3; an emergent section 4d that is a window in the side wall 4b; and a highly transmissive optical member 5, such as glass, bonded to cover the emergent section 4d. The light source 2 is fixed on the base plate 4a so as to oppose the optical member 5, and the light-receiving element 3 is formed on the surface of the base plate 4a in close proximity to the light source 2. In addition, laser beam (returned light) emitted from the light source 2 and reflected by the DVD 17 is diffracted by a diffraction grating 5a formed on the optical member 5 so as to be guided to a predetermined position of the light-receiving element 3. Since a sufficiently large diffraction angle of the returned light diffracted by the diffraction grating 5a is not obtained because narrowing of the pitch of the diffraction grating 5a is limited (the narrower the pitch of the grating, the larger the diffraction angle obtained), the light-receiving element 3 is formed in close proximity to the light source 2. The optical member 5 is fixed to the emergent section 4d after the position thereof has been adjusted so that the light diffracted by the diffraction grating 5a is guided to a predetermined position of the light-receiving element 3 by a predetermined reference optical system.

The optical unit 8 is composed of a light source 6 that is a laser diode chip for emitting laser light of a wavelength of 780 nm for the CD 18; a light-receiving element 7 consisting of a photo-diode for receiving laser beam reflected by the CD 18; a base plate 8a having the light source 6 and the light-receiving element 7, a side wall 8b fixed to the base plate 8a to contain the light source 6 and the light-receiving element 7; an emergent section 8d that is a window in the side wall 8b; and a highly transmissive optical member 9, such as glass, bonded to cover the emergent section 8d. The light source 6 is fixed on the base plate 8a so as to oppose the optical member 9, and the light-receiving element 7 is formed on the surface of the base plate 8a in close proximity to the light source 6. Returned light emitted from the light source 6 and reflected by the CD 18 is diffracted by a diffraction grating 9a formed on the optical member 9 so as to be guided to a predetermined position of the light-receiving element 7.

The light-receiving element 7 is formed in close proximity to the light source 6 for the same reason as for the optical unit 4. In order to effect tracking control by a three-beam method, the optical member 9 is provided with a beam formation section 9b. The optical member 9 is fixed to the emergent section 8d after the position thereof has been adjusted so that the light diffracted by the diffraction grating 9a is guided to a predetermined position of the light-receiving element 7 by a predetermined reference optical system.

The beam splitter 10 guides both laser beams from the light source 2 and the light source 6 to the DVD 17 (CD 18). The beam splitter 10 is shaped like a rectangular parallelepiped in which two prisms are bonded to each other, and a bonding surface is coated with an optical film (dichroic film)

having a wavelength selecting function. The dichroic film is formed so as to transmit the laser beam for the CD 18 and to reflect the laser beam for the DVD 17.

The wavelength filter 15 is formed so as to transmit the laser beam emitted from the light source 2, and to reflect or absorb the laser light emitted from the light source 6, thereby restricting diameters of laser beams emitted from the light source 2 and the light source 6. Therefore, when spots of laser beams emitted from the light sources 2 and 6 and condensed by the objective lens 16 are applied onto the DVD 17 and CD 18, respectively, aberration is reduced.

Dispositions of the optical units 4 and 8, and reading of information of the DVD 17 and CD 18 will now be described in detail.

The optical unit 4 and the optical unit 8 are disposed to form an angle of about 90° starting from the beam splitter 10. The optical unit 8 is disposed in a direction nearly parallel to an optical axis of light travelling from the wavelength filter 15 to the objective lens 6, and the optical unit 4 is disposed in a direction nearly perpendicular to an optical axis travelling from the wavelength filter 15 to the objective lens 16.

In such a configuration, when reading information from the DVD 17, the laser light emitted from the light source 2 at a wavelength of 650 nm passes through the emergent section 4d and the diffraction grating 5a to enter the beam splitter 10. The laser beam incident on the beam splitter 10 is reflected and is emitted therefrom while the optical axis thereof is bent about 90°, and enters the wavelength filter 15 provided adjacent to the beam splitter 10. The laser beam for the DVD 17 from the light source 2 is transmitted by the wavelength filter 15 with almost no restriction of the diameter thereof. The laser beam transmitted by the wavelength filter 15 enters the objective lens 16, and is then focused on an information-recording surface of the DVD 17 by a focusing action of the objective lens 16.

Thereafter, the laser beam reflected by the DVD 17 is transmitted by the objective lens 16 and the wavelength film 15 again, is reflected by the beam splitter 10 while the optical axis thereof is bent toward the optical unit 4, and enters the diffraction grating 5a. The laser beam is diffracted by the diffraction grating 5a to enter the light receiving section formed on the light-receiving element 3. In this case, the laser beam incident on the light receiving section is subjected to photoelectric conversion, whereby reading signals, obtained by converting current outputs according to the signals on the information-recording surface of the DVD 17 into voltage signals, are formed and output from external terminals 4c of the optical unit 4. In addition, a part of a laser beam incident on the light receiving section is used for focusing control and tracking control.

On the other hand, when reading the information from the CD 18, the laser beam emitted from the light source 6 at an oscillation wavelength of 780 nm passes through the emergent section 8d, the beam formation section 9b, and the diffraction grating 9a. In this case, the laser beam consisting of three beams formed by the beam formation section 9b enters the beam splitter 10. The laser beam incident on the beam splitter 10 is transmitted by the beam splitter 10, is emitted unchanged from the beam splitter 10, and enters the wavelength filter 15 formed adjacent to the beam splitter 10. The laser beam for the CD 18 from the light source 6 is reflected by zones formed on the outer peripheral portion of the wavelength filter 15 and is transmitted by a portion where the zones are not formed, whereby the wavelength filter 15 functions like a diaphragm for the laser beam for the CD 18 and restricts the diameter of the laser beam entering the objective lens 16. The laser beam transmitted by the wavelength film 15 enters the objective lens 16. Then, the laser beam is focused on an information-recording surface of the CD 18 by a focusing action of the objective lens 16.

Thereafter, the laser beam reflected by the CD 18 is transmitted by the objective lens 16 and the wavelength film 15 again, and is transmitted by the beam splitter 10 to enter the diffraction grating 9a. The laser beam is diffracted by the diffraction grating 9a to enter the light receiving section formed on the light-receiving element 7 without being caught by the beam formation section 9b. In this case, the laser beam incident on the light receiving section is subjected to photoelectric conversion, whereby reading signals, obtained by converting current outputs according to the signals on the information-bearding surface of the CD 18 into voltage signals, are formed and output from external terminals 8c of the optical unit 8. In addition, a part of the laser beam incident on the light receiving section is used for focusing control and tracking control by a three-beam method.

As described above, in the conventional optical unit 4 (8) shown in FIG. 5, the minute light source 2 (6) and light-receiving element 3 (7) are disposed side by side in close proximity to each other on the base plate 4a (8a), the side wall 4b (8b) is fixed to the base plate 4a (8a) to contain the light source 2 (6) and the light-receiving element 3 (7), and the minute optical member 5 (9) is bonded to the emergent section 4d (8d) of the side wall 4b (8b), thereby reducing the size of the optical unit 4 (8). Therefore, the conventional optical unit 4 (8) is suitable for reduction in size of an optical pickup.

However, while a small optical pickup is necessary for use in a portable device, such as a notebook personal computer, the need is increasing for an optical pickup which can reduce cost rather than size.

In the conventional optical unit, a minute laser diode chip is used as the light source 2 (6), and a minute photodiode formed on the surface of the base plate 4a (8a) by a process similar to a semiconductor process is used as the light-receiving element 3 (7), and the minute optical member 5 (9) is used. Therefore, it is difficult to handle these components, and a delicate operation for fixing or forming the components on the base plate 4a (8a) is required, resulting in increased process cost and increased cost of the optical unit.

In addition, in order to guide returned light from the optical disk to the light-receiving element 3 (7), the conventional optical unit 4 (8) includes the optical member 5 (9) having the diffraction grating 5a (9a) which can be formed at low cost with a simple structure. The cost of the optical unit 4 may be reduced by using the diffraction grating 5a (9a) and by merely replacing the light source 2 (6) and the light-receiving element 3 (7) with a semiconductor laser and a light-receiving element consisting of discrete components that are available at low cost and are easy to handle. This method, however, cannot be adopted because the space between a light emitting point of the semiconductor laser and a light receiving position of the light-receiving element cannot be reduced. Furthermore, diffracted returned light cannot be received by the light-receiving element of the diffraction grating 5a (9a), which cannot yield a sufficiently large diffraction angle as described above.

On the other hand, if the space between the optical member 5 (9) and the semiconductor laser and the light-receiving element consisting of discrete components are increased sufficiently, an optical unit can be formed even with the configuration of the conventional optical unit 4 (8). However, the size of the optical unit is considerably increased and an optical unit of practical size cannot be formed.

In addition, when the optical unit is incorporated into the optical pickup serving as an optical device using light sources for emitting light of two different wavelengths, two optical units 4 and 8 corresponding to the two wavelengths should be used, resulting in an increased number of components and a complicated structure of the optical pickup.

SUMMARY OF THE INVENTION

Accordingly, it is an object of the present invention to provide a compound optical unit which is able to reduce the cost of the unit, which is able to correspond to an optical device using a plurality of light sources for emitting light of different wavelengths even in the case of one compound optical unit, and which can also be applied to the optical pickup.

According to an aspect of the present invention, there is provided a compound optical unit including a housing mounted on an optical device. A light emitting mechanism, a light receiving member, and a composite optical member are integrally fixed to the housing. The light emitting member includes a light-emitting element and a first package containing the light-emitting element. The light-receiving member includes a light-receiving element and a second package containing the light-receiving element. The housing includes an entering/emitting opening to emit light emitted from the light emitting member and to admit returned light from the optical device. The composite optical member is disposed among the entering/emitting opening, the light emitting member, and the light receiving member.

In the compound optical unit, the composite optical member may preferably include an incidence surface to admit light emitted from the light emitting member, a first emission surface to emit the light from the light emitting member, a diffracting mechanism provided on the first emission surface to diffract the returned light, a reflecting surface to reflect light diffracted by the diffracting device, and a second emission surface to emit light reflected by the reflecting surface toward the light receiving member.

In addition, the diffracting mechanism may preferably include a diffraction grating having a rugged part directly formed on the emission surface.

Furthermore, the composite optical member including the diffraction grating may preferably be made of resin, and may be integrally formed by molding.

Furthermore, in the compound optical unit, a plurality of light emitting members each having the light-emitting elements of different wavelengths may preferably be provided, and a multiplexor to multiplex light emitted from each of the light emitting members in along a parallel optical path may preferably be provided on the housing.

The multiplexor may be combined with the composite optical member.

In addition, the multiplexor may comprise a prism having an optical film that transmits or reflects the light emitted from each of the light emitting members, and the prism may be fixed to the composite optical member with the optical film plane-joined to a part of the composite optical member.

In the compound optical unit, the light receiving member may have a plurality of the light-receiving elements of different wavelengths.

In addition, the optical device may comprise an optical pickup which is equipped with an objective lens and which performs writing or reading of information on an optical disk, and light emitted from the light emitting member may be applied to the optical disk through the objective lens, and returned light from the optical disk may be received by the light receiving member.

Furthermore, the composite optical member may include an incidence surface to admit light from the light emitting member, a first emission surface to emit the light from the light emitting member, a diffracting mechanism provided on the first emission surface to diffract the returned light, a reflecting surface to reflect light diffracted by the diffracting mechanism, and a second emission surface to emit light reflected by the reflecting surface toward the light receiving member.

In another embodiment, the compound optical unit comprises an optical device mounted on a housing. A composite optical member is integrally fixed to the housing and disposed between a light emitting element and a light receiving element. Light from the light emitting element is transmitted through the composite optical member towards the optical device and light returning from the optical member is directed through the composite optical member towards the light receiving element.

The composite optical member may comprise a diffracting mechanism provided on the composite optical member to diffract the light returning from the optical device and a reflecting surface provided on the composite optical member to reflect light diffracted by the diffracting mechanism towards the light receiving element. The reflecting surface is inclined towards the light receiving element.

The diffracting mechanism may comprise a diffraction grating including a rugged part directly formed on a surface of the composite optical member. The composite optical member and the diffraction grating may be integrally formed.

The composite optical member may include a plurality of light-emitting elements of different wavelengths and a multiplexor to multiplex light emitted from the light emitting elements along an optical path provided in the housing. The multiplexor may be fixed to the composite optical member. The multiplexor, in addition, may include a prism having an optical film to transmit or reflect light emitted from each light emitting element. The prism may be fixed to the composite optical member with the optical film plane-joined to a surface of the composite optical member. The composite optical member may comprise a rectangular parallelepiped section.

The compound optical unit may further comprise a plurality of light receiving elements of different wavelengths contained within a light receiving member.

The optical device may include an optical pickup equipped with an objective lens and performing reading or writing of information on an optical disk, for which the light emitted from the light emitting element is applied to the optical disk through the objective lens and the light returning from the optical disk is received by the light receiving element. The optical device may include a DVD player or a read/write recordable player. The light emitting element and light receiving element may be discrete electronic components.

Further objects, features, and advantages of the present invention will become apparent from the following description of the preferred embodiments with reference to the attached drawings.

DESCRIPTION OF THE PREFERRED EMBODIMENTS

Figure 1:
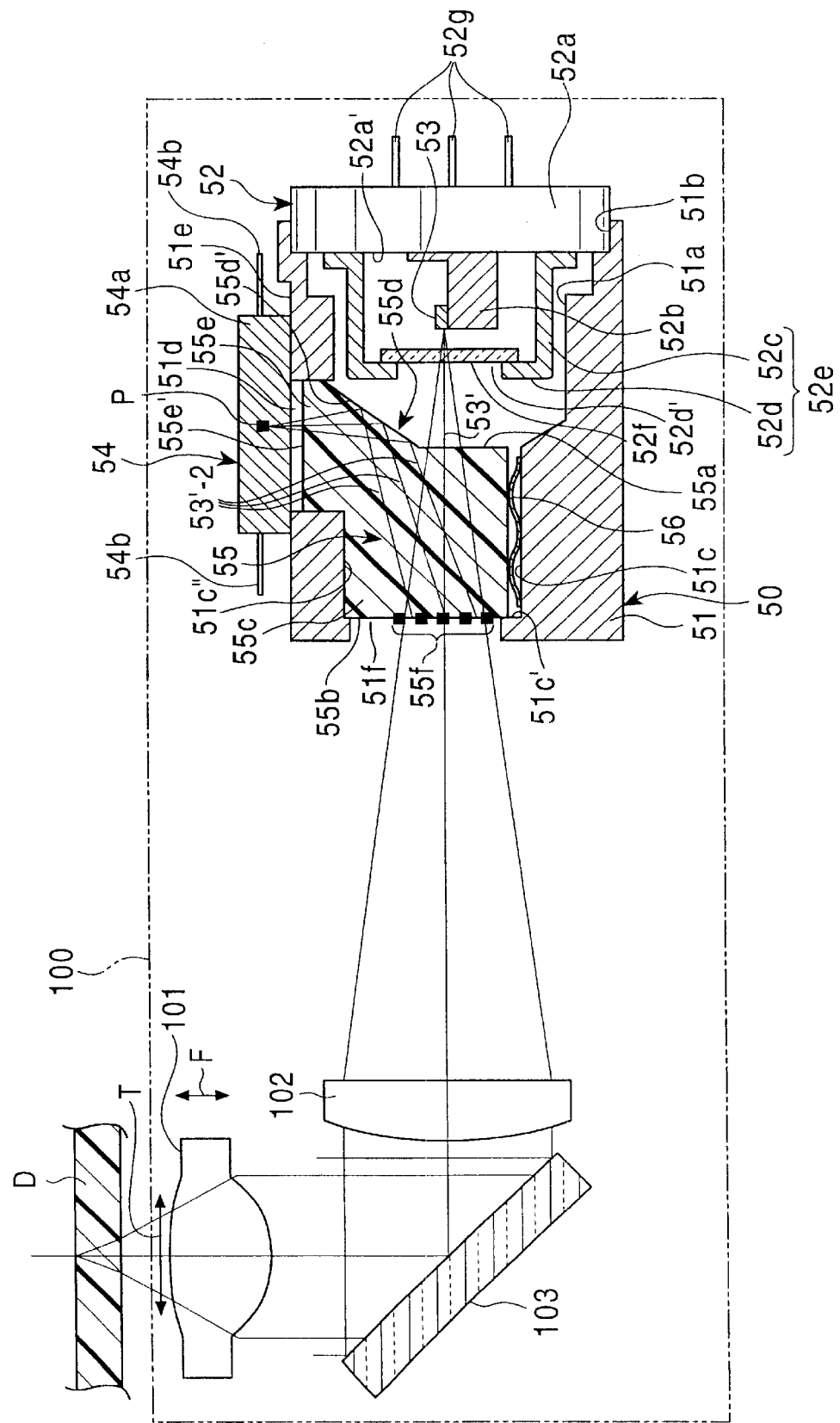
FIG. 1 is a partially sectional side elevation view showing an optical pickup 100 including a compound optical unit 50 according to a first embodiment of the present invention.

FIG. 1 shows an optical device, i.e., an optical pickup 100 including a compound optical unit 50 according to a first embodiment of the present invention.

The compound optical unit 50 is fixed to the optical pickup 100 at a predetermined position. The compound optical unit 50 is a combination light receiving/emitting optical element, and is used for reading information recorded on an optical disk D or for writing information on the optical disk D.

The optical pickup 100 is disposed to oppose an optical disk D and includes an objective lens 101 movably supported in a focusing direction (F) (direction perpendicularly intersecting a surface of the optical disk D), and in a tracking direction (T) (radial direction of the optical disk D). In this embodiment, the optical disk D is a DVD.

The compound optical unit 50 primarily consists of a semiconductor laser (light emitting member) 52, a light receiving member 54, a composite optical member 55, and a housing 51 to which these members are integrally fixed.

The semiconductor laser 52 is composed of a disk-like base plate 52a, a base 52b shaped like a rectangular parallelepiped protruding from one plane surface 52a' of the base plate 52a, a laser diode 53 located and fixed to an end of a side wall surface of the base 52b, a cap 52e consisting of a cylindrical body portion 52c fixed to the plane surface 52a' of the base plate 52a to contain the base 52b and a top board 52d formed with an opening 52d', and a transparent disk-like glass plate 52f fixed to the cap 52e to close the opening 52d' from the inside of the cap 52e. In this way, the laser diode 53 is placed in an airtight space in a first package constituted by the base plate 52a, the cap 52e, and the glass plate 52f. The laser diode 53 emits laser beam of a wavelength of 650 nm.

The optical axis of the laser beam 53', which is emitted from the laser diode 53, is transmitted by the glass plate 52f in a direction perpendicularly intersecting the plane surface 52a' of the base plate 52a. External connecting terminals 52g are provided to protrude from the other plane surface at the opposite side of one plane surface 52a' of the base plate 52a, and driving current is supplied to the laser diode 53 via the external connecting terminals 52g.

On the other hand, the light receiving member 54 is composed of a second package, i.e., a package 54a containing therein a light-receiving element (not shown) consisting of a PIN photodiode or the like, and external connecting terminals 54b protruding from both sides of the package 54a. A power supply voltage for the light-receiving element can be supplied, or output signals subjected to photoelectric conversion by the light-receiving element can be output to the outside via the external connecting terminals 54b.

The composite optical member 55 is formed of highly transmissive resin having high light transmission, and is composed of a rectangular parallelepiped section 55c having an incidence surface 55a and one emission surface 55b, disposed parallel to each other, an inclined surface 55d integrally formed with the incidence surface 55a, and a protrusion 55e protruding from a side wall of the rectangular parallelepiped section 55c. The emission surface 55b is formed with a diffraction grating 55f of predetermined pitch. The surface of the inclined surface 55d is coated with an optical thin film (not shown), whereby a reflecting surface 55d' is formed on the inner wall surface of the inclined surface 55d. In addition, an end surface of the protrusion 55e is formed with the other emergent plate 55e'. In this way, the reflecting surface 55d' is formed on an interface between the composite optical member 55 and the outside. Similarly, the incidence surface 55a, the emission surface 55b, and the emission surface 55e' are formed on an interface between the composite optical member 55 and the outside. In this embodiment, the composite optical member 55 is integrally molded using a molding die, and a rugged part in a grid pattern, serving as the diffraction grating 55f, is integrally formed on the emission surface 55b at the same time the composite optical member 55 is molded.

The housing 51 is formed of a metal block, such as an aluminum die-cast block or the like, a hole 51a for disposing the semiconductor laser 52 is formed in the right side thereof, and a mounting hole 51b for locating and mounting the semiconductor laser 52 is formed in a right end surface thereof. In addition, a mounting hole 51c for mounting the composite optical member 55 is formed in the left side of the housing 51 so as to be coupled to the hole 51a. Abutment surfaces 51c' and 51c" for mounting the composite optical member 55 are formed at a left end portion and an upper end portion of the mounting hole 51c. Furthermore, a through hole 51d is formed in the middle of a longitudinal direction (lateral direction in the figure) of the housing 51 on the side of the abutment surface 51c" of the mounting hole 51c. An outer wall surface of the housing 51 covering the through hole 51d is formed with a mounting surface 51e for locating and mounting thereon the light receiving member 54. On the other hand, an opening 51f is formed in the left end surface of the housing 51 so as to open the abutment surface 51c' of the mounting hole 51c. A cylindrical metal block, a metal block shaped like a rectangular parallelepiped, or another polygonal prismatic metal block may be used. In addition, the metal block is not limited to the aluminum die-cast block, and a zinc die-cast block, a block made of magnesium alloy, or a block made of other metal may be used.

Incorporation of the semiconductor laser 52, the light receiving member 54, and the composite optical member 55 into the housing 51 will now be described.

The rectangular parallelepiped section 55c of the composite optical member 55 is inserted into the mounting hole 51c of the housing 51, and the protrusion 55e is fitted into the through hole 51d, and the emission surface 55b is brought into abutment with the abutment surface 51c', and the side wall surface of the rectangular parallelepiped section 55c is urged by a wavy leaf spring 56 to abut against the abutment surface 51c", whereby the composite optical member 55 is located in the housing 51 and is adhered by an adhesive agent or the like. In this case, the emission surface 55b formed with the diffraction grating 55f is exposed from the opening 51f of the housing 51.

The cap 52e of the semiconductor laser 52 is inserted into the hole 51a of the housing 51, and the outer edge of the base plate 52a on the side of the plane surface 52a' is fitted into the mounting hole 51b formed in the housing 51, whereby the semiconductor laser 52 is located in the housing 51 and is adhered by an adhesive agent or the like.

The light receiving member 54 is located on the mounting surface 51e at a predetermined position so that the light-receiving element thereof opposes the through hole 51d of the housing 51, and is adhered by an adhesive agent or the like. The light receiving member 54 forms an angle of 90° with respect to the semiconductor laser 52. In addition, the position of the light receiving member 54 is adjusted by a predetermined reference optical system in advance so that it is guided to a light receiving position P of the light-receiving element when returned light of the laser beam 53' emitted from the laser diode 53 is diffracted by the diffraction grating 55f and is reflected by the reflecting surface 55d', and is then adhered to the mounting surface 51e.

On the other hand, adhered to the optical pickup 100 are a collimator lens 102 coaxially disposed with an optical axis of the laser light 53', and an initial mirror 103 disposed at an angle of about 45° with respect to the optical axis of the laser light 53.

Reading of information from the optical disk D will now be described.

In the above-described configuration, when reading the information from the optical disk D, the laser beam 53' emitted from the laser diode 53 of the semiconductor laser 52 is transmitted by the diffraction grating 55f after being transmitted by the emission surface 55a of the composite optical member 55, and is emitted from the emission surface 55b. Then, the laser beam 53' is collimated by the collimator lens 102, and a direction of the collimated laser beam 53' is changed about 90° by the initial mirror 103 so as to enter the objective lens 101. The laser beam 53' passing through the objective lens 101 is focused on the information-recording surface of the optical disk D by a focusing action of the objective lens 101.

Thereafter, the laser beam 53' reflected by the optical disk D is transmitted by the objective lens 101 again, is reflected by the initial mirror 103, is transmitted by the collimator lens 102, and then enters the diffraction grating 55f so as to be turned into laser beam 53'-2 diffracted at a predetermined diffraction angle. The laser beam 53'-2 is further reflected by the reflecting surface 55d' of the composite optical member 55, and the reflected beam is emitted from the emission surface 55e' toward the light receiving position P of the light receiving-element of the light receiving member 54. In this case, the laser beam incident on the light-receiving element is subjected to photoelectric conversion, whereby reading signals, obtained by converting current outputs according to signals on the information-recording surface of the optical disk D into voltage signals, are formed and output from the external connecting terminals 54b. In addition, a part of the laser beam incident on the light-receiving element is used for focusing control and tracking control.

According to this embodiment, as shown in FIG. 1, the compound optical unit 50 has the housing 51 mounted on the optical pickup 100; the semiconductor laser 52, the light receiving member 54, and the composite optical member 55 are fixed to the housing 51; the semiconductor laser 52 is composed of the first package consisting of the base plate 52a, the cap 52e, and the glass plate 52f, and the external connecting terminals 52g protruding from the base plate 52a; and the light receiving member 54 is composed of the second package (package 54a) containing therein the light-receiving element and the external connecting terminals 54b provided on the package 54a. Accordingly, even the semiconductor laser 52 and the light receiving member 54, which are so-called discrete components manufactured at low cost, can be incorporated into the housing 51, so that they are easily handled and incorporated into the housing 51. Furthermore, the composite optical member 55 can be formed in the same size as the semiconductor laser 52 and the light receiving member 54, thereby facilitating handling thereof. Therefore, the material cost and the process cost can be reduced.

In addition, the composite optical member 55 includes the incidence surface 55a and the emission surface 55b into which the laser beam 53' emitted from the semiconductor laser 52 enters and is emitted therefrom, the emission surface 55b is provided with the diffraction grating 55f for diffracting returned light reflected by the optical disk D; the reflecting surface 55d' for reflecting the laser beam 53'-2 reflected by the reflection surface 55d'; and the emission surface 55e' for emitting the laser beam 53'-2 reflected by the reflecting surface 55d' to the light receiving member 54. Therefore, the laser beam 53'-2 can be further deflected to be guided to the light receiving position P of the light receiving member 54 that is disposed at an angle of about 90° with respect to the semiconductor laser 52. In addition, the semiconductor laser 52 and the light receiving member 54 can be disposed so as to form an angle of 90° with respect to the housing 51 without increasing the size of the compound optical unit 50 by providing the semiconductor laser 52 and the light receiving member 54 parallel to the housing 51, whereby the compound optical unit 50 can be formed in a practical size.

Furthermore, the diffraction grating 55f, which is a common optical element with a simple structure, is used to diffract returned light, whereby the composite optical member 55 can be formed at low cost.

The rugged part in a grid pattern constituting the diffraction grating 55f is integrally formed at the same time the composite optical member 55 is molded, so that the diffraction grating 55f can be formed without increasing the cost of molding the composite optical member 55.

While the semiconductor laser 52 having the laser diode 53 for emitting the laser beam 53' of wavelength for a DVD is used in this embodiment, the semiconductor laser 52 is not limited thereto. For example, by using a semiconductor laser having a laser diode for a CD, a CD-ready compound optical unit can be formed. In addition, a semiconductor laser provided with a laser diode having a wavelength other than that for a DVD and for a CD may be used.

A second embodiment of the present invention will now be described with reference to FIG. 2.

Figure 2:
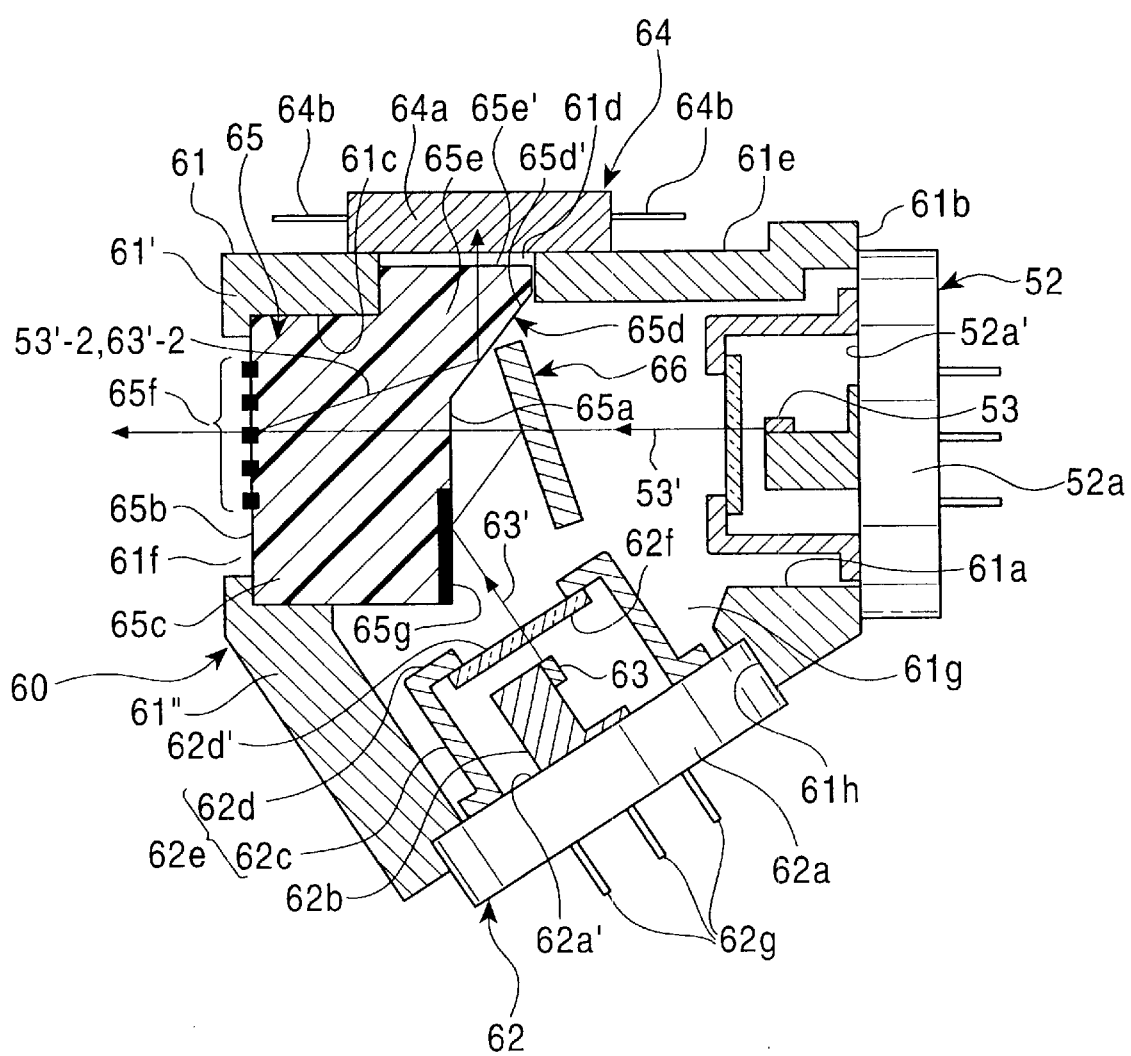
FIG. 2 is a sectional view of a compound optical unit 60 according to a second embodiment of the present invention.

FIG. 2 is a sectional view of a compound optical unit 60 according to the second embodiment of the present invention. In the figure, the same components as those of the first embodiment are indicated by the same reference numerals. In addition, only the compound optical unit 60 is shown in the figure, and the optical pickup and the optical disk in FIG. 1 are omitted.

This embodiment shows a compound optical unit for use in an optical pickup including two semiconductor lasers having laser diodes of different wavelengths, and writing or reading information on both a DVD and a CD.

The compound optical unit 60 primarily consists of semiconductor lasers (light emitting members) 52 and 62, a light receiving member 64, a composite optical member 65, a beam splitter (multiplexor) 66, and a housing 61 to which these members are integrally fixed.

The semiconductor laser 62 includes a laser diode 63 for oscillating a laser wavelength of 780 nm for a CD. From the viewpoint of the shape, the semiconductor laser 62 is composed of, like the semiconductor laser 52, a disk-like base plate 62a, a base 62b shaped like a rectangular parallelepiped protruding from one plane surface 62a', a laser diode 53 located and fixed to an end of a side wall surface of the base 62b, a cap 62e consisting of a cylindrical body portion 62c fixed to the plane surface 62a' of the base plate 62a to contain the base 62b and a top board 62d formed with an opening 62d', and a transparent disk-like glass plate 62f fixed to the cap 62e to close the opening 62d' from the inside of the cap 62e. In this way, the laser diode 63 is placed in an airtight space in a first package constituted by the base plate 62a, the cap 62e, and the glass plate 62f.

The optical axis of laser beam 63', which is emitted from the laser diode 63, is transmitted by the glass plate 62f in a direction perpendicularly intersecting the plane surface 62a' of the base plate 62a. In addition, external connecting terminals 62g are provided to protrude from the other plane surface at the opposite side of one plane surface 52a' of the base plate 62a, and driving current is supplied to the laser diode 63 via the external connecting terminals 62g.

The light receiving member 64 is composed of a second package, i.e., a package 64 containing therein a light-receiving element (not shown) consisting of a PIN photodiode or the like, and external connecting terminals 64b protruding from both sides of the package 64a. A power supply voltage for the light-receiving element can be supplied, or output signals subjected to photoelectric conversion by the light-receiving element can be output to the outside via the external connecting terminals 64b.

The composite optical member 65 is formed of highly transmissive resin, and is composed of a rectangular parallelepiped section 65c having an incidence surface 65a and one emission surface 65b, disposed parallel to each other, an inclined surface 65d integrally formed with the incidence surface 65a, and a protrusion 65e protruding from a side wall of the rectangular parallelepiped section 65c. The emission surface 65b is formed with a diffraction grating 65f of predetermined pitches. The surface of the inclined surface 65d is coated with an optical thin film (not shown), whereby a reflecting surface 65d' is formed on the inner wall surface of the inclined surface 65d. In addition, an end surface of the protrusion 65e is formed with the other emission surface 65e'. A reflecting surface 65g is formed to be flush with the incidence surface 65a. In this way, the reflecting surface 65d' is formed on an interface between the composite optical member 65 and the outside. Similarly, the incidence surface 65a, the emission surface 65b, the emission surface 65e', and the reflecting surface 65g are formed on an interface between the composite optical member 65 and the outside. In this embodiment, as in the case of the first embodiment, the composite optical member 65 is integrally molded using a molding die, and a rugged part in a grid pattern, serving as the diffraction grating 65f, is integrally formed on the emission surface 65b of the composite optical member 65 at the same time the composite optical member 65 is molded.

The beam splitter 66 is a rectangular plate optical element, and has functions of passing therethrough almost all laser beam of a wavelength of 650 nm for a DVD emitted from the semiconductor laser 52, and of reflecting almost all laser beam of a wavelength of 780 nm for a CD emitted from the semiconductor laser 62. The beam splitter 66 is formed by, for example, stacking a plurality of optical films each having predetermined optical characteristics on the surface of glass. The beam splitter 66 may be a half mirror.

The housing 61 is made of metal, and consists of a cylindrical body portion 61' and a protrusion 61" protruding downward in the figure from the body portion 61'. A hole 61a for disposing the semiconductor laser 52 is formed in the right side of the body portion 61', and a mounting surface 61b for locating and mounting thereto the semiconductor laser 52 is formed on the right end surface thereof. In addition, a mounting hole 61c for mounting the composite optical member 65 is formed in the left side of the body portion 61' so as to be coupled to the hole 61a. In addition, a hole 61g for disposing the semiconductor laser 62 is formed to be coupled to the hole 61a and the mounting hole 61c in a direction inclined toward a longitudinal direction (lateral direction in the figure) of the body portion 61'. A mounting hole 61h for locating and mounting the semiconductor laser 62 is formed in the opening edge of the mounting hole 61g. Furthermore, a through hole 61d is formed in the upper side wall surface of the body portion 61', and an outer wall surface of the housing 61 covering the through hole 61d is formed with a mounting surface 61e for locating and mounting thereon the light receiving member 64. On the other hand, an opening 61f if formed in the left end surface of the body portion 61'.

The outline of incorporation of the semiconductor lasers 52 and 62, the light receiving member 64, and the composite optical member 65 into the housing 61 will now be described.

The rectangular parallelepiped section 65c of the composite optical member 65 is inserted into the mounting hole 61c formed in the body portion 61', and the protrusion 65e is fitted into the through hole 61d formed in the body portion 61', whereby the composite optical member 65 is located in the housing 61 and is adhered by an adhesive agent or the like.

The semiconductor laser 52 is inserted into the hole 61a formed in the body portion 61', and the outer edge of the one plane surface 62a' of the base plate 62a is fitted into the mounting hole 61h, whereby the semiconductor laser 52 is located in the housing 61 and is adhered by an adhesive agent.

The light receiving member 64 is located on the mounting surface 61e at a predetermined position so that the light-receiving element thereof opposes the through hole 61d formed in the body portion 61' of the housing 61, and is adhered by an adhesive agent or the like. The position of the light receiving ember 64 is adjusted by a predetermined reference optical system in advance so that it is guided to a light receiving position of the light-receiving element when returned lights of laser beams 53' and 63' emitted from the laser diodes 53 and 63 are diffracted by the diffraction grating 65f and are reflected by the reflecting surface 65d', and is then adhered to the mounting surface 61e.

The beam splitter 66 is fixed to the housing 61 at a section between the composite optical member 65 and the semiconductor laser 52 in such a manner that it is inclined with respect to the incidence surface 65a of the composite optical member 65.

Reading of information from the DVD (not shown) will now be described.

In the above-described configuration, when reading the information from the DVD, the laser beam 53' emitted from the laser diode 53 of the semiconductor laser 52 is transmitted by incidence surface 65a of the composite optical member 65 after being transmitted by the beam splitter 66, and is further transmitted by diffraction grating 65f and is emitted from the emission surface 65b. Then, the laser beam 53' is collimated by a collimator lens (not shown), and a direction of the collimated laser beam 53' is changed about 90° by an initial mirror (not shown) so as to enter an objective lens (not shown). The laser beam 53' passing through the objective lens is focused on an information-recording surface of the DVD by a focusing action of the objective lens.

Thereafter, the laser beam 53' reflected by the DVD is transmitted by the objective lens again, is reflected by the initial mirror, passes through the collimator lens, and then enters the diffraction grating 65f so as to be turned into laser beam 53'-2 diffracted at a predetermined diffraction angle. The laser beam 53'-2 is further reflected by the reflecting surface 65d' formed on the composite optical member 65, and the reflected beam is emitted from the emission surface 65e' toward a light receiving position of the light-receiving element of the light receiving member 64. In this case, the laser beam incident on the light-receiving element is subjected to photoelectric conversion, whereby reading signals, obtained by converting current outputs according to signals of the information-recording surface of the DVD into voltage signals, are formed and output from the external connecting terminals 64b. In addition, a part of the laser beam incident on the light-receiving element is used for focusing control and tracking control.

When reading the information from the CD, the laser beam 63' emitted from the laser diode 63 of the semiconductor laser 62 is further reflected by the beam splitter 66 after being reflected by the reflecting surface 65g formed on the composite optical member 65, whereby the laser beam 63' and the laser beam 53' emitted from the laser diode 53 are multiplexed in the same optical path. The laser beam 63' is transmitted by the incidence surface 65a of the composite optical member 65, is transmitted by the diffraction grating 65f, and is emitted from the emission surface 65b. Then, the laser beam 63' is collimated by the collimated lens, and a direction of the collimated laser beam. 63' is changed about 90° by the initial mirror so as to enter the objective lens. The laser beam 63' passing through the objective lens is focused on the information-recording surface of the CD by a focusing action of the objective lens.

Thereafter, the laser beam 63' reflected by the CD is transmitted by the objective lens again, is reflected by the initial mirror, is transmitted by the collimator lens, and then enters the diffraction grating 65f so as to be turned into laser beam 63'-2 diffracted at a predetermined diffraction angle. The laser beam 63'-2 is further reflected by the reflecting surface 65d' formed on the composite optical member 65, and the reflected beam is emitted from the emission surface 65e' toward a light receiving position of the light-receiving element of the light receiving member 64. In this case, the laser beam incident on the light-receiving element is subjected to photoelectric conversion, whereby reading signals, obtained by converting current outputs according to signals on the information-recording surface of the CD into voltage signals, are formed and output from the external connecting terminals 64b of the light receiving member 64. In addition, a part of the laser beam incident on the light-receiving element is used for focusing control and tracking control.

As described above, according to this embodiment, advantages similar to those of the first embodiment can be obtained. In addition, the semiconductor lasers 52 and 62, having laser diodes 53 and 63 of different wavelengths for a DVD and for a CD, respectively, are provided, and the beam splitter 66 to multiplex the laser beams 53' and 63' emitted from the semiconductor lasers 52 and 62 in the same optical path is integrally formed with the housing 61. This makes it possible to dispose two semiconductor lasers 52 and 62 on the housing 61, and even the single compound optical unit 60 can correspond to an optical pickup for reading information of both the DVD and the CD. In addition, by multiplexing the laser beams 53' and 63' in the same optical path, the structure can be simplified, and the compound optical unit 60 can be formed at low cost.

Figure 3:
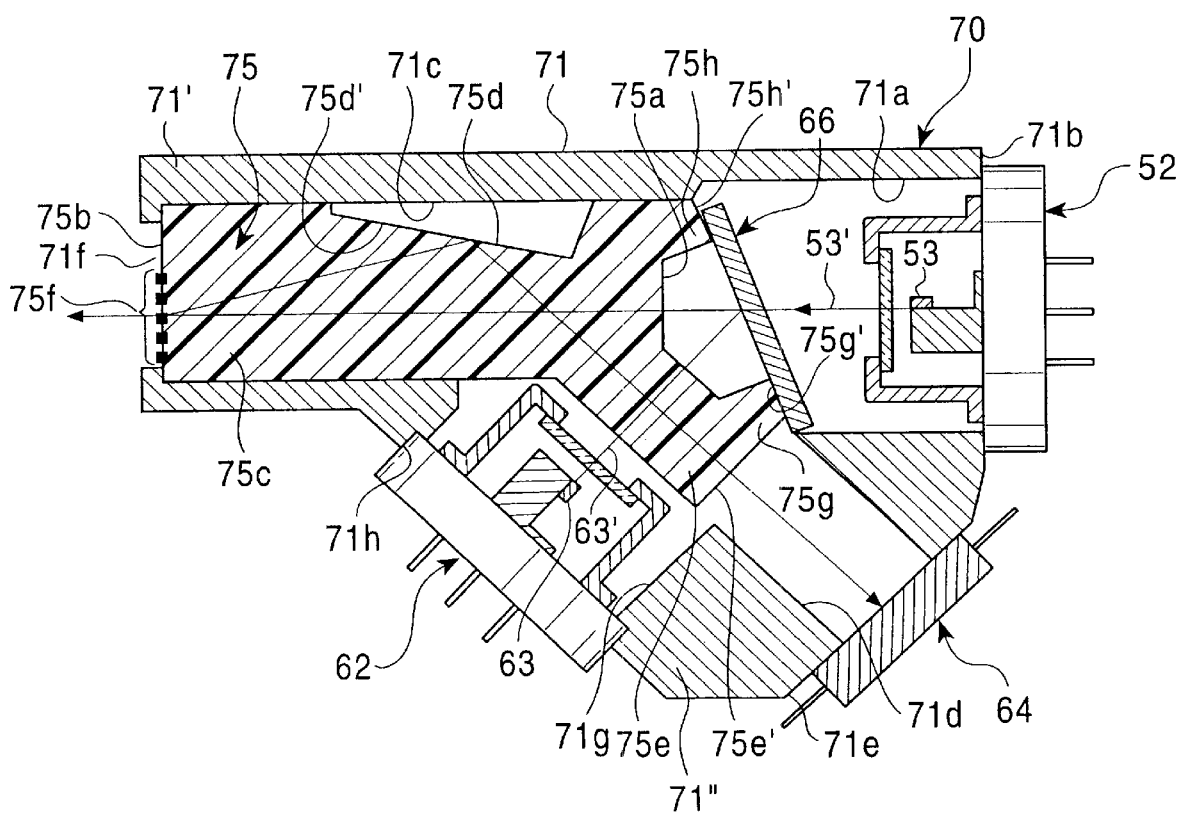
FIG. 3 is a sectional view of a compound optical unit 70 according to a third embodiment of the present invention.

A third embodiment of the present invention will now be described with reference to FIG. 3. FIG. 3 is a sectional view of a compound optical unit 70 according to the third embodiment of the present invention. In the figure, the same components as those of the first and second embodiments are indicated by the same reference numerals.

This embodiment shows a combination of the composite optical member and the beam splitter in the second embodiment.

The compound optical unit 70 primarily consists of semiconductor lasers (light emitting members) 52 and 62, a light receiving member 64, a composite optical member 75, a beam splitter (multiplexor) 66, and a housing 71 to which these members are integrally fixed.

The composite optical member 75 is formed of highly transmissive resin, and is composed of a rectangular parallelepiped section 75c having an incidence surface 75a and one emission surface 75b, disposed parallel to each other, a protrusion 75e protruding at an angle from the incidence surface 75a, a mounting section 75g further protruding from the protrusion 75e, and a mounting section 75h protruding from the incidence surface 75a. The emission surface 75b is formed with a diffraction grating 75f of predetermined pitch. A wedge-shaped cutout 75d is formed in the top face of the rectangular parallelepiped section 75c, and the inside of the cutout 75d is coated with an optical thin film (not shown), whereby a reflecting surface 75d' is formed on the inner wall surface of the cutout 75d. In addition, an end surface of the protrusion 75e is formed with the other emission surface 75e'. End surfaces 75g' and 75h' of the mounting sections 75g and 75h are formed to be flush with each other, and the plane is inclined with respect to the incidence surface 75a. In this way, the reflecting surface 75d' is formed on an interface between the composite optical member 75 and the outside. Similarly, the incidence surface 75a, the emission surface 75b, and the emission surface 75e' are formed on an interface between the composite optical member 75 and the outside. In this embodiment, as in the case of the first embodiment, the composite optical member 75 is integrally molded using a molding die, and a rugged part in a grid pattern, serving as the diffraction grating 75f, are integrally formed on the emission surface 75b of the composite optical member 75 at the same time the composite optical member 75 is molded.

The housing 71 is made of metal, and consists of a cylindrical body portion 71' and a protrusion 71" protruding downward in the figure from the body portion 71'. A hole 71a for disposing the semiconductor laser 52 is formed in the right side of the body portion 71', and a mounting surface 71b for locating and mounting thereto the semiconductor laser 52 is formed on the right end surface thereof. In addition, a mounting hole 71c for mounting the composite optical member 75 is formed in the left side of the body portion 71' so as to be coupled to the hole 71a. In addition, a hole 71g for disposing the semiconductor laser 62 and a through hole 71d for the light receiving member 64 are formed in the protrusion 71" in directions to form an angle of 90°, and are coupled to the hole 71a and the mounting hole 71c. A mounting hole 71h for locating and mounting the semiconductor laser 62 is formed in the opening edge of the mounting hole 71g. Furthermore, an outer wall surface of the housing 71, covering the through hole 71d, is formed with a mounting surface 71e for locating and mounting thereon the light receiving member 64. On the other hand, an opening 71f is formed in the left end surface of the body portion 71'.

Since incorporation of the semiconductor lasers 52 and 62, and the light receiving member 64 into the housing 71 is the same as the second embodiment, description thereof will be omitted. Incorporation of the composite optical member 75 into the housing 71 will now be described.

The composite optical member 75 is located on the housing 71 and adhered by an adhesive agent or the like with the rectangular parallelepiped section 75c inserted into the mounting hole 71c formed in the body portion 71'. The beam splitter 66 is fixed to the housing 71 in a state of abutting against the end surfaces 75g' and 75h' of the mounting sections 75g and 75h formed on the composite optical member 75.

In the thus-configured compound optical unit 70, a laser beam 53' emitted from the semiconductor laser 52 is transmitted by the beam splitter 66 and enters the incidence surface 75a of the composite optical member 75. A laser beam 63' emitted from the semiconductor laser 62 is reflected by the beam splitter 66 after passing through the protrusion 75e of the composite optical member 75, and then the laser beams 53' and 63' are multiplexed in the same optical path.

According to this embodiment, not only advantages similar to those of the second embodiment can be obtained, but also the composite optical member 75 and the beam splitter 66 can be fixed to the housing 71 in a state of being integrally formed with each other in advance. Therefore, the number of assembly processes can be further reduced and the cost can be reduced as compared to a case where the composite optical member 75 and the beam splitter 66 are fixed separately to the housing 71.

Figure 4:
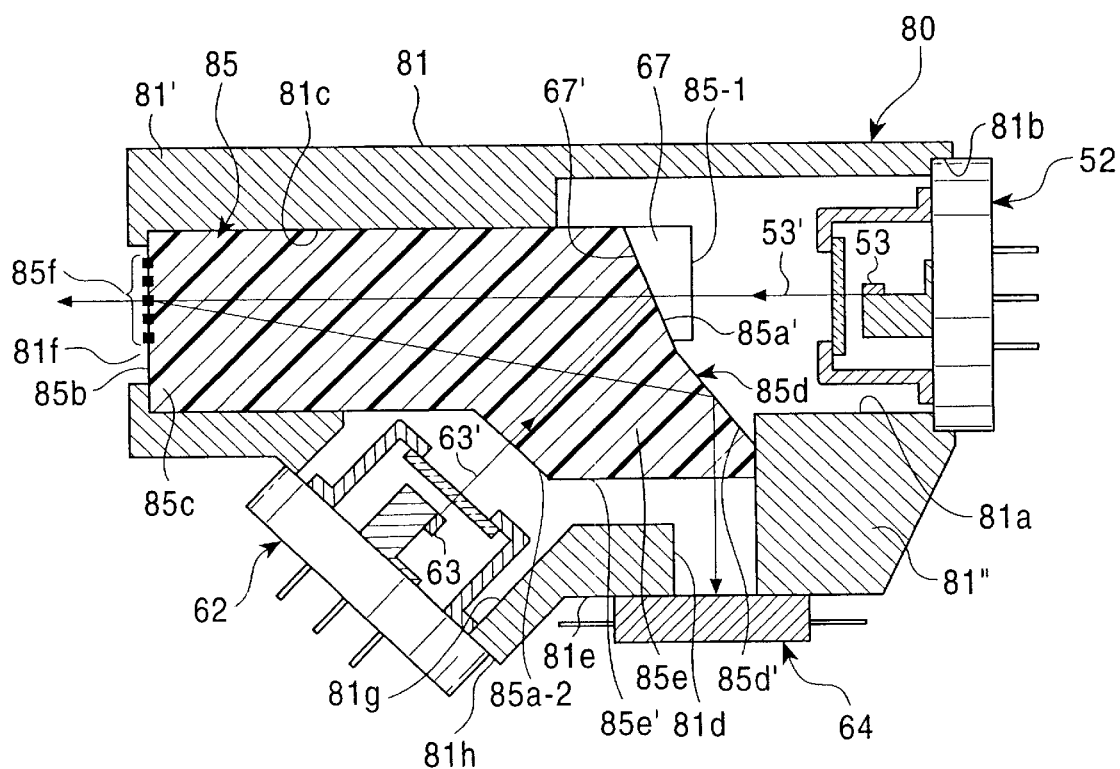
FIG. 4 is a sectional view of a compound optical unit 80 according to a fourth embodiment of the present invention.
Figure 5:
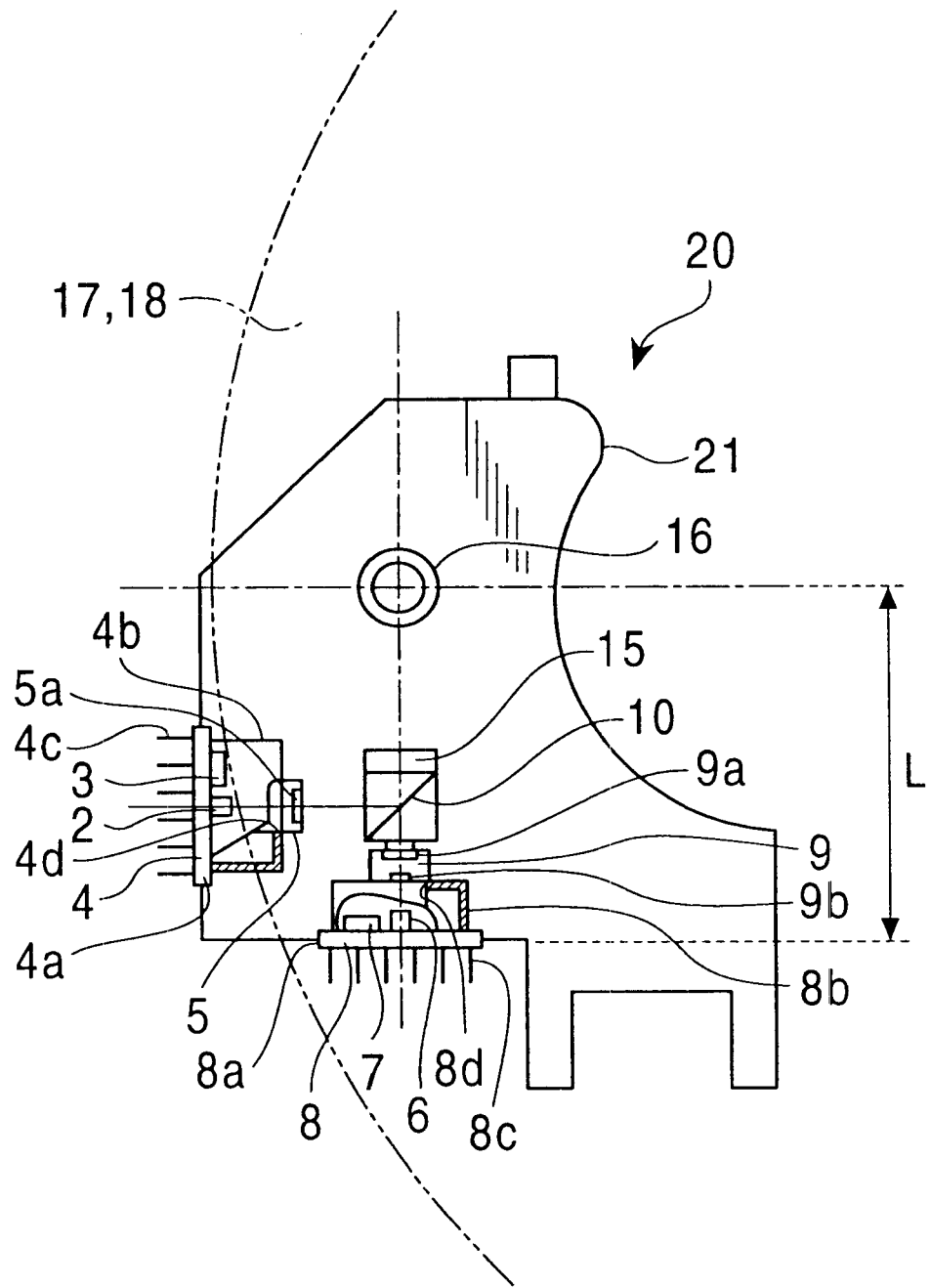
FIG. 5 is a plan view showing an optical pickup having conventional optical units mounted thereon.

A fourth embodiment of the present invention will now be described with reference to FIG. 4. FIG. 4 is a sectional view of a compound optical unit 80 according to the fourth embodiment of the present invention. In the figure, the same components as those of the first to third embodiments are indicated by the same reference numerals.

In this embodiment, a multiplexor multiplexor is a dichroic prism 67, and the dichroic prism 67 and a composite optical member 85 are combined.

The compound optical unit 80 primarily consists of semiconductor lasers (light emitting members) 52 and 62, a light receiving member 64, the composite optical member 85, the dichroic prism 67 (multiplexor), and a housing 81 to which these members are integrally fixed.

The composite optical member 85 consists of highly transmissive resin, and is composed of a square pole section 85c having an inclined surface 85a' and one emission surface 85b at both ends thereof, and a trapezoidal protrusion 85e protruding downward from the inclined surface 85a' of the square pole section 85c. An inclined surface 85d, which is one of the side walls of the protrusion 85e, is coated with an optical thin film (not shown), whereby a reflecting surface 85d' is formed on the inner wall surface of the inclined surface 85d, and an inclined surface (the other side wall portion) is formed with an incidence surface 85a-2. In addition, the emission surface 85b is formed with a diffraction grating 85f of predetermined pitch.

An end surface of the protrusion 85e is formed with the other emission surface 85e'. The dichroic prism 67 having a dichroic film (optical film) 67' formed on one surface thereof is adhered to the inclined surface 85a' in such a manner that the dichroic film 67' is plane-joined to the inclined surface 85a'. An incidence surface 85a-1 is formed on the opposite plane of the dichroic prism 67 from the plane where the dichroic film 67' is formed. The incidence surface 85a-1 is formed so as to be parallel to the emission surface 85b of the composite optical member 85. In this way, the reflecting surface 85d' is formed on an interface between the composite optical member 85 and the outside. Similarly, the incidence surface 85a-2, the emission surface 85b, and the emission surface 85e are formed on an interface between the composite optical member 85 and the outside. In this embodiment, as in the case of the first embodiment, the composite optical member 85 is integrally molded using a molding die, and a rugged part in a grid pattern, serving as the diffraction grating 85f, is integrally formed on the emission surface 85b of the composite optical member 85 at the same time the composite optical member 85 is molded.

The dichroic prism 67 is obtained by forming the dichroic film 67', having functions of passing therethrough almost all laser beam 53' of a wavelength of 650 nm for a DVD emitted from the semiconductor laser 52 and of reflecting almost all laser beam 63' of a wavelength of 780 nm for a CD emitted from the semiconductor laser 62, on a predetermined surface of a glass material. The dichroic film 67' is formed by, for example, stacking a plurality of optical thin films each having predetermined optical characteristics on the surface of the glass material. A translucent prism having a semi-transparent film formed on the surface thereof may be used instead of the dichroic prism 67. The semitransparent film is an optical film having functions of, for example, transmitting and reflecting about 50% of the laser beam of a wavelength of 650 nm for the DVD and about 50% of the laser beam of a wavelength of 780 nm for the CD.

The housing 81 is made of metal, and consists of a cylindrical body portion 81', and a protrusion 81" protruding downward in the figure from the body portion 81'. A hole 81a for disposing the semiconductor laser 52 is formed in the right side of the body portion 81', and a mounting hole 81b for locating and mounting thereto the semiconductor laser 52 is formed in the right end surface thereof. In addition, a mounting hole 81c for mounting the composite optical member 85 is formed in the left side of the body portion 81' so as to be coupled to the hole 81a. In addition, a hole 81g for disposing the semiconductor laser 62, and a through hole 81d for the light receiving member 64 are formed in the protrusion 81". The through hole 81d is formed in a direction to form an angle of 90° with the semiconductor laser 52, and the hole 81g is formed in a direction to form an acute angle with the through hole 81d. Furthermore, the through hole 81d and the hole 81g are coupled to the hole 81a and the mounting hole 81c. An opening edge of the hole 81g is formed with a mounting surface 81h for locating and mounting thereto the semiconductor laser 62. An outer wall surface of the housing 71 covering the opening edge of the through hole 81d is formed with a mounting surface 81e for locating and mounting thereon the light receiving member 64. On the other hand, an opening 81f is formed in the left end surface of the body portion 81'.

The composite optical member 85 having the dichroic prism 67 adhered thereto is located in the housing 81, and is adhered by an adhesive agent or the like with the square pole section 85c inserted into the mounting hole 81c formed in the body portion 81'.

In the thus-configured compound optical unit 80, the laser beam 53' emitted from the semiconductor laser 52 enters the incidence surface 85a-1, and is then transmitted by the dichroic prism 67. On the other hand, the laser beam 63' emitted from the semiconductor laser 62 enters an incidence surface 85a-2 formed on the protrusion 85e of the composite optical member 85, and is then reflected by the dichroic prism 67. The laser beams 53' and 63' are multiplexed in the same optical path.

According to this embodiment, not only advantages similar to those of the third embodiment can be obtained, but also mounting accuracy of the dichroic prism 67 can be increased because the dichroic prism 67 is fixed to the composite optical member 85 in such a manner that the dichroic film 67' of the dichroic prism 68 is directly bonded to the inclined surface 85a' of the composite optical member 85.

In addition, as a fifth embodiment of the present invention, by using a semiconductor laser (not shown) having two laser diodes of different wavelengths for a DVD and a CD in one package in the first embodiment, a compound optical unit for an optical pickup for writing or reading information on both a DVD and a CD can be formed. In this case, the multiplexor used in the second to fourth embodiments is not required, whereby the cost of the compound optical unit for an optical pickup for reading information on both a DVD and a CD can be further reduced. The present invention can be applied to a compound optical unit in which a laser diode having a wavelength other than for the DVD and the CD. In addition, the present invention can be applied to a compound optical unit using a semiconductor laser which has three or more light sources of different wavelengths in one package.

In the second to fifth embodiments, the housings 51, 61, 71, and 81 may be formed of an aluminum die-cast, a zinc-die-cast, a magnesium alloy, or other metal, as in the case of the first embodiment. In addition, the housings 51, 61, 71, and 81 may be formed of resin.

While resin is used as a material for the composite optical members 55, 65, 75, and 85 in the first to fifth embodiment, glass material may be used.

In addition, while reading of information from the DVD or the CD by the compound optical units 50, 60, 70, and 80 are described in the first to fifth embodiments, the compound optical units 50, 60, 70, and 80 can correspond to writing of the information on the DVD or the CD.

In the second to fourth embodiments, the mounting positions of the semiconductor lasers 52 and 62 may be exchanged. In this case, the beam splitter 66 and the dichroic prism 67 are changed to a beam splitter and a dichroic prism each having characteristics of reflecting the laser beam 53' of a wavelength for a DVD and of transmitting the laser beam 63' of a wavelength for CD. When a half mirror is used as a multiplexorinstead of the beam splitter 66, and when a prism having a semitransparent film is used instead of the dichroic prism 67, they can be used unchanged.

Furthermore, as has been described in the above embodiments, the compound optical unit of the present invention can be applied to an optical pickup which is equipped with an objective lens and which performs writing or reading of information on an optical disk.

The compound optical unit of the present invention can be also applied as a combination light receiving/emitting optical element, which emits light from a light source and receives returned light, to other optical devices.

As described above, according to the present invention, the compound optical unit has a housing mounted to an optical device. In the compound optical unit, a light emitting mechanism, a light receiving member, and a composite optical member are integrally fixed to the housing; the light emitting member is composed of a light-emitting element, a first package containing the light-emitting element, and external connecting terminals provided on the first package; the light-receiving member is composed of a light-receiving element, a second package containing the light-receiving element, and external connecting terminals provided on the second package. In addition, the housing includes an entering/emitting opening for emitting light emitted from the light emitting member and entering returned light from the optical device, and the composite optical member is disposed among the entering/emitting opening, the light emitting member, and the light receiving member. Therefore, the light emitting member and the light receiving member, which are so-called discrete components manufactured at low cost, can be incorporated into the housing, so that both components are easily handled and incorporated into the housing. Furthermore, the composite optical member can be formed in the same size as the light emitting member and the light receiving member, thereby facilitating handling thereof. Accordingly, the material cost and the process cost can be reduced. In addition, since the light emitting member and the light receiving member are combined with the housing, the relationship between the light emitting member and the light receiving member is not changed even by the adjustment of the compound optical unit effected after the compound optical unit is mounted on the optical device. Therefore, wide allowable ranges of the positions and the angles of the compound optical unit can be ensured, thereby facilitating the adjustment.

Furthermore, the composite optical member is provided with an incidence surface for entering light emitted from the light emitting member, one emission surface for emitting the light, a diffracting device provided on the emission surface for diffracting the returned light, a reflecting surface for reflecting light diffracted by the diffracting device, and the other emission surface for emitting light reflected by the reflecting surface toward the light receiving member. Therefore, the light diffracted by the diffracting device can be further deflected by the reflecting surface to be emitted from the emission surface toward the light receiving member, whereby the versatility of possible position of the light receiving member with respect to the light emitting member is increased. Accordingly, the light emitting member and the light receiving member can be disposed on the housing at the optimum positions without increasing the size of the compound optical unit by providing the light emitting member and the light receiving member parallel to the housing, whereby the compound optical unit can be formed in a practical size.

Furthermore, the diffracting device is a diffraction grating consisting of a rugged part directly formed on the emission surface, and is a common optical element with a simple structure, whereby the composite optical member can be formed at low cost.

Furthermore, the composite optical member provided with the diffraction grating is made of resin, and is integrally formed by molding, so that the diffraction grating can be formed without increasing the molding cost of the composite optical member.

Furthermore, a plurality of the light emitting members each having the light-emitting elements of different wavelengths are provided, and a multiplexor to multiplex light emitted from each of the light emitting members in the same optical path is provided on the housing, so that a plurality of light emitting members can be disposed on the housing, and even one compound optical unit can correspond to an optical device using a plurality of light sources of different wavelengths. In addition, the compound optical unit can be formed at low cost with a simple structure.

Furthermore, since the multiplexoris combined with the composite optical member, the composite optical member and the multiplexor multiplexorcan be fixed to the housing in a state of being integrally formed with each other in advance. Therefore, the number of assembly processes can be further reduced and the cost can be reduced as compared to a case where the composite optical member and the multiplexorare separately fixed to the housing.

Furthermore, the multiplexor is a prism having an optical film for transmitting or reflecting the light emitted from each of the light emitting members at a predetermined rate, and the prism is fixed to the composite optical member with the optical film plane-joined to a part of the composite optical member. Therefore, the multiplexor can be mounted with reference to a part of the composite optical member, whereby mounting accuracy of the multiplexor can be further increased.

Furthermore, the light receiving member has a plurality of the light-receiving elements of different wavelengths. Therefore, the multiplexor is not required, and the cost of the compound optical unit corresponding to an optical device using a plurality of light sources of different wavelengths can be further reduced.

Furthermore, the optical device is an optical pickup which is equipped with an objective lens and which performs writing or reading of information on an optical disk, and wherein light emitted from the light emitting member is applied to the optical disk through the objective lens, and returned light from the optical disk is received by the light receiving member. Therefore, the present invention is applicable to an optical pickup.

Furthermore, the composite optical member includes an incidence surface for entering light from the light emitting member, one emission surface for emitting the light, a diffracting device provided on the emission surface for diffracting returned light, a reflecting surface for reflecting light diffracted by the diffracting device, and the other emission surface for emitting light reflected by the reflecting surface toward the light receiving member. Therefore, the optical path of the returned light can be deflected to a position separated from an optical path from the incidence surface to the emission surface, and large components, such as discrete components, can be also used, whereby the cost of the compound optical unit can be reduced.

What is claimed is:

1. A compound optical unit comprising:
    a housing;
    a plurality of light emitting members each including a light-emitting element that emits light of a different wavelength than at least one of the light-emitting elements of the other light emitting members, a light receiving member including a light-receiving element, and a composite optical member all integrally fixed to said housing;
    a first package containing said light-emitting elements;
    a second package containing said light-receiving element; and
    a multiplexor multiplexing light emitted from said light emitting members along an optical path provided in said housing;
    said housing including an entering/emitting opening to emit light emitted from said light emitting members and that allows light returning towards said composite optical member to enter said composite optical member; and
    said composite optical member disposed among said entering/emitting opening, said light emitting members, and said light receiving member.

2. A compound optical unit according to claim 1, said composite optical member further comprising:
    an incidence surface to admit light emitted from said light emitting members;
    a first emission surface to emit said light from said light emitting members;
    a diffracting mechanism provided on said first emission surface to diffract said light returning towards said composite optical member;
    a reflecting surface to reflect light diffracted by said diffracting mechanism; and
    a second emission surface to emit light reflected by said reflecting surface toward said light receiving member.

3. A compound optical unit according to claim 2, said diffracting mechanism comprising a diffraction grating including a rugged part directly formed on said first emission surface.

4. A compound optical unit according to claim 3, said composite optical member provided with said diffraction grating being resin and integrally formed by molding.

5. A compound optical unit according to claim 1, said multiplexor being combined with said composite optical member.

6. A compound optical unit according to claim 5, said multiplexor comprising a prism having an optical film to one of transmit and reflect light emitted from each of said light emitting members, said prism being fixed to said composite optical member with said optical film plane-joined to a surface of said composite optical member.

7. A compound optical unit according to claim 1, said light receiving member having a plurality of light-receiving elements of different wavelengths.

8. An optical pickup comprising the compound optical unit according to claim 1, and equipped with an objective lens, and the optical pickup performing one of reading and writing of information on an optical disk, said light emitted from said light emitting members being applied to said optical disk through said objective lens, and said light returning from said optical disk being received by said light receiving member.

9. A compound optical unit according to claim 1, said composite optical member further comprising:
    an incidence surface to admit light from said light emitting members;
    a first emission surface to emit the light from said light emitting members;
    a diffracting mechanism provided on said emission surface to diffract said light returning from said optical device;
    a reflecting surface to reflect light diffracted by said diffracting mechanism; and
    a second emission surface to emit light reflected by said reflecting surface toward said light receiving member.

10. A compound optical unit comprising:
    a housing;
    a plurality of light emitting elements each of which emits light of a different wavelength than at least one of the other light-emitting elements;
    a multiplexor to multiplex light emitted from said light emitting elements along an optical path provided in said housing;
    a light receiving element; and a composite optical member integrally fixed to said housing and disposed between said light emitting element and said light receiving element;

light from said light emitting element being transmitted through the composite optical member away from said light emitting element and light returning from the optical member being directed through the composite optical member towards the light receiving element.

11. A compound optical unit according to claim 10, said composite optical member further comprising:

a diffracting mechanism to diffract said light returning towards said composite optical member; and a reflecting surface to reflect light diffracted by said diffracting mechanism towards said light receiving element, said reflecting surface being inclined towards said light receiving element.

12. A compound optical unit according to claim 11, said diffracting mechanism comprising a diffraction grating including a rugged part directly formed on a surface of said composite optical member.

13. A compound optical unit according to claim 12, said composite optical member and said diffraction grating being integrally formed.

14. A compound optical unit according to claim 10, said multiplexor being fixed to said composite optical member.

15. A compound optical unit according to claim 14, said multiplexor including a prism having an optical film to one of transmit and reflect light emitted from said light emitting element, said prism being fixed to said composite optical member with said optical film plane-joined to a surface of said composite optical member.

16. A compound optical unit according to claim 10, further comprising a plurality of light receiving elements of different wavelengths contained within a light receiving member.

17. An optical pickup comprising said compound optical unit according to claim 10 and equipped with an objective lens, said optical pickup performing one of reading and writing of information on an optical disk, said light emitted from said light emitting elements being applied to said optical disk through said objective lens, and said light returning from said optical disk being received by said light receiving element.

18. The compound optical unit of claim 10, the composite optical member comprising a rectangular parallelepiped section.

19. The compound optical unit of claim 10, the optical device including a DVD player.

20. The compound optical unit of claim 10, the light emitting elements and light receiving element being discrete electronic components.

21. A compound optical unit comprising:

a housing;

a plurality of discrete light emitting members each containing a light emitting element of a unique wavelength;

a light receiving element;

a composite optical member disposed between said light emitting elements and said light receiving element and having an inclined light reflecting surface to deflect light of wavelengths of the light emitting elements, said light emitting elements, the plurality of light emitting members, light receiving element and composite optical member all integrally fixed to said housing;

a light director to multiplex light from said light emitting elements through the composite optical member along an optical path; and a diffraction grating provided on a surface of composite optical member, the diffraction grating combined with the light reflecting surface of the composite optical member to direct light returning from the optical member through the composite optical member towards the light receiving element;

said housing including an entering/emitting opening that allows light emitted from said light emitting members to exit and that allows light returning towards the composite optical member to enter.

22. The compound optical unit of claim 21, the light reflecting surface being coated with an optical film.

23. The compound optical unit of claim 21, the light director comprising a beam splitter.

24. The compound optical unit of claim 21, the light director comprising a dichroic prism having an optical film.

25. The compound optical unit of claim 21, the composite optical member comprising a rectangular parallelepiped section.

26. A DVD player including the compound optical unit of claim 21.

27. A recordable optical device including the compound optical unit of claim 21.

28. A compound optical unit comprising:

a housing;

a light emitting member including a light-emitting element, a light receiving member including a plurality of light-receiving elements of different wavelengths, and a composite optical member all integrally fixed to said housing;

a first package containing said light-emitting element;

a second package containing said light-receiving elements;

said housing including an entering/emitting opening to emit light emitted from said light emitting member and that allows light returning towards the composite optical member to enter said composite optical member; and said composite optical member disposed among said entering/emitting opening, said light emitting member, and said light receiving member.

29. A compound optical unit according to claim 28, said composite optical member further comprising:

an incidence surface to admit light emitted from said light emitting member;

a first emission surface to emit said light from said light emitting member;

a diffracting mechanism provided on said first emission surface to diffract said light returning towards said composite optical member;

a reflecting surface to reflect light diffracted by said diffracting mechanism; and a second emission surface to emit light reflected by said reflecting surface toward said light receiving member.

30. A compound optical unit according to claim 29, said diffracting mechanism comprising a diffraction grating including a rugged part directly formed on said first emission surface.

31. A compound optical unit according to claim 30, said composite optical member provided with said diffraction grating being resin and integrally formed by molding.

32. A compound optical unit according to claim 28, further comprising a plurality of light emitting members each including a light-emitting element that emits light of a different wavelength than at least one of the light-emitting elements of the other light emitting members, and a multiplexor multiplexing light emitted from each of said light emitting members along an optical path provided in said housing.

33. A compound optical unit according to claim 32, said multiplexor being combined with said composite optical member.

34. A compound optical unit according to claim 32, said multiplexor comprising a prism having an optical film to one of transmit and reflect light emitted from each of said light emitting members, said prism being fixed to said composite optical member with said optical film plane-joined to a surface of said composite optical member.

35. An optical pickup comprising the compound optical unit according to claim 28 and equipped with an objective lens, the optical pickup performing one of reading and writing of information on an optical disk, said light emitted from said light emitting member being applied to said optical disk through said objective lens, and said light returning from said optical disk being received by said light receiving member.

36. A compound optical unit according to claim 28, said composite optical member further comprising:
   an incidence surface to admit light from said light emitting member;
   a first emission surface to emit the light from said light emitting member;
   a diffracting mechanism provided on said emission surface to diffract said light returning toward said composite optical member;
   a reflecting surface to reflect light diffracted by said diffracting mechanism; and
   a second emission surface to emit light reflected by said reflecting surface toward said light receiving member.

37. A compound optical unit comprising:
   a housing;
   a light emitting element;
   a plurality of light receiving elements of different wavelengths; and
   a composite optical member integrally fixed to said housing and disposed between said light emitting element and said light receiving elements;
   light from said light emitting element being transmitted through the composite optical member and light returning toward the composite optical member being directed through the composite optical member towards the light receiving elements.

38. A compound optical unit according to claim 37, said composite optical member further comprising:
   a diffracting mechanism to diffract said light returning towards said composite optical member; and
   a reflecting surface to reflect light diffracted by said diffracting mechanism towards said light receiving elements, said reflecting surface being inclined towards said light receiving elements.

39. A compound optical unit according to claim 38, said diffracting mechanism comprising a diffraction grating including a rugged part directly formed on a surface of said composite optical member.

40. A compound optical unit according to claim 39, said composite optical member and said diffraction grating being integrally formed.

41. A compound optical unit according to claim 37, further comprising a plurality of light-emitting elements of different wavelengths and a multiplexor to multiplex light emitted from said light emitting elements along an optical path provided in said housing.

42. A compound optical unit according to claim 41, said multiplexor being fixed to said composite optical member.

43. A compound optical unit according to claim 41, said multiplexor including a prism having an optical film to one of transmit and reflect light emitted from said light emitting element, said prism being fixed to said composite optical member with said optical film plane-joined to a surface of said composite optical member.

44. An optical pickup comprising the compound optical unit according to claim 37 and equipped with an objective lens, the optical pickup performing one of reading and writing of information on an optical disk, said light emitted from said light emitting element being applied to said optical disk through said objective lens, and said light returning from said optical disk being received by said light receiving elements.

45. A compound optical unit according to claim 37, the composite optical member comprising a rectangular parallelepiped section.

* * * * *